United States Patent [19]
Deetz

[11] Patent Number: 5,988,764
[45] Date of Patent: Nov. 23, 1999

[54] TIRE RIM FOR WHEELS OF CYCLES IN GENERAL ADAPTED TO ALLOW AN EASY AND FIRM ASSEMBLING OF THE TIRE

[75] Inventor: Josh Deetz, Madone, Italy

[73] Assignee: Vittoria S.p.A., Madone, Italy

[21] Appl. No.: 08/877,012

[22] Filed: Jun. 16, 1997

[30] Foreign Application Priority Data

Sep. 27, 1996 [IT] Italy ................................. MI960645 U

[51] Int. Cl.$^6$ ...................................................... B60B 21/02
[52] U.S. Cl. ........................................... 301/95; 152/381.3
[58] Field of Search ..................... 301/95–99; 152/379.3, 152/379.4, 379.5, 381.3, 381.4, 381.5, 381.6, 384

[56] References Cited

U.S. PATENT DOCUMENTS

| | | | |
|---|---|---|---|
| 2,477,833 | 8/1949 | Schwinn | ..................................... 301/97 |
| 4,077,455 | 3/1978 | Curtiss, Jr. et al. | .................. 301/97 X |

FOREIGN PATENT DOCUMENTS

| | | | |
|---|---|---|---|
| 329167 | 9/1935 | Italy | ......................................... 301/97 |
| 14776 | of 1897 | United Kingdom | ..................... 301/97 |

Primary Examiner—Russell D. Stormer
Attorney, Agent, or Firm—Bucknam and Archer

[57] ABSTRACT

The present invention relates to a tire rim for wheels of cycles in general adapted to allow an easy and firm assembling of the tire, and has the main feature that the rim comprises a body the cross-section of which defines a well for the tire, laterally delimited by ridges adjoining recesses for the tire bead, which recesses are delimited on their outside by a hook portion or rim flange having a top inwardly curved crook portion.

2 Claims, 3 Drawing Sheets

5,988,764

TIRE RIM FOR WHEELS OF CYCLES IN GENERAL ADAPTED TO ALLOW AN EASY AND FIRM ASSEMBLING OF THE TIRE

BACKGROUND OF THE INVENTION

The present invention relates to a tire rim for wheels of cycles in general adapted to allow an easy and firm assembling of the tire.

As is known, tire rims for wheels of cycles and the like are conventionally formed by a body which defines side walls delimiting a region for housing therein the tire and operating as a tire bead restraining element.

With the disclosed arrangement difficulties are frequently encountered in assembling the tire to the tire rim and, moreover, it is not possible to provide a precise coupling of the tire bead to the side edges of the rim.

This can be caused by a not perfectly symmetrical and balanced coupling of the tire, with the self-evident drawbacks deriving therefrom, even during the running of the cycle, because of a not proper balancing of the rim.

SUMMARY OF THE INVENTION

Accordingly, the aim of the present invention is to overcome the above mentioned drawbacks, by providing a tire rim for wheels of cycles in general adapted to allow an easy and firm assembling of the tire, affording the possibility of obtaining, in a substantially automatic manner, a proper assembly of the rim tire, with a proper engagement of the tire bead in the recesses provided therefor.

Within the scope of the above mentioned aim, a main object of the present invention is to provide such a rim construction, for wheels of cycles in general, which is very compact and strong and in which all the component elements can achieve a perfectly balanced position with respect to the rotary axis of the wheel.

Yet another object of the present invention is to provide such a tire rim which, owing to its peculiar features, is very reliable and safe in operation.

Yet another object of the present invention is to provide such a tire rim, for wheels of cycles in general, which can be easily made starting from easily available elements and materials, and which, moreover, is very competitive from a mere economic standpoint.

According to one aspect of the present invention, the above mentioned aim and objects, as well as yet other objects, which will become more apparent hereinafter, are achieved by a tire rim for wheels of cycles in general adapted to allow an easy and firm assembling of the tire, characterized in that said tire rim comprises a body the cross section of which defines a well for the rim tire, said well being laterally delimited by ridges adjoining recesses for the tire bead, said recesses being delimited on the outside thereof by a hook portion.

BRIEF DESCRIPTION OF THE DRAWINGS

Further characteristics and advantages of the present invention will become more apparent from the following detailed disclosure of a rim construction for wheels of cycles in general, according to the invention.

The above mentioned features are specifically designed for assuring a very easy and firm assembling of the tire to the tire rim, as illustrated by way of an indicative, but not limitative example, in the accompanying drawings, where.

DESCRIPTION OF THE PREFERRED EMBODIMENT

Figures 1, 2:
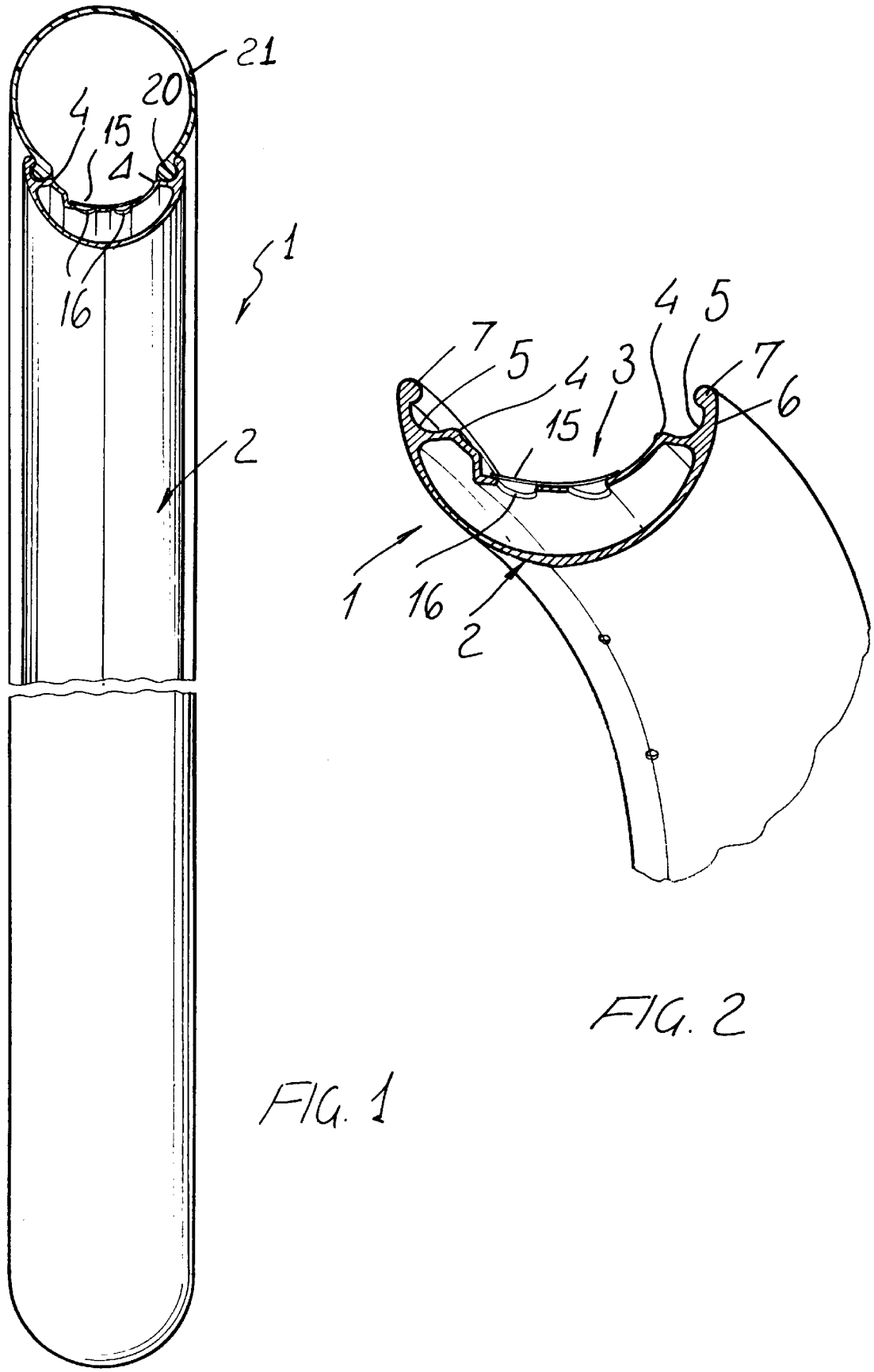
FIG. 1 is a schematic partially cross-sectioned view illustrating a wheel using the tire rim according to the invention.
FIG. 2 is a schematic perspective view illustrating the rim.
Figure 3:
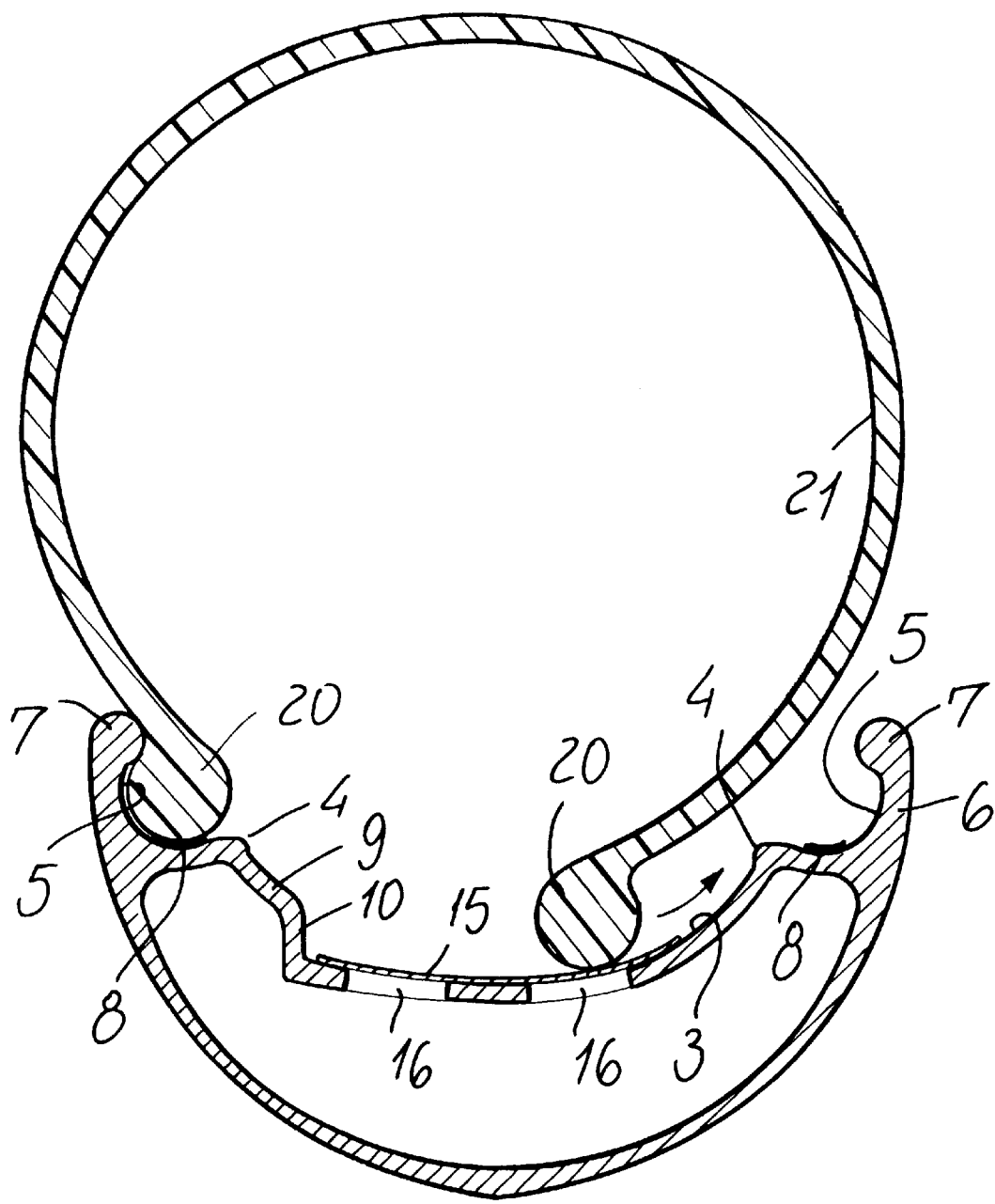
FIG. 3 is a cross-sectional view, on an enlarged scale, illustrating the coupling step in which the tire is coupled to the tire rim.
Figure 4:
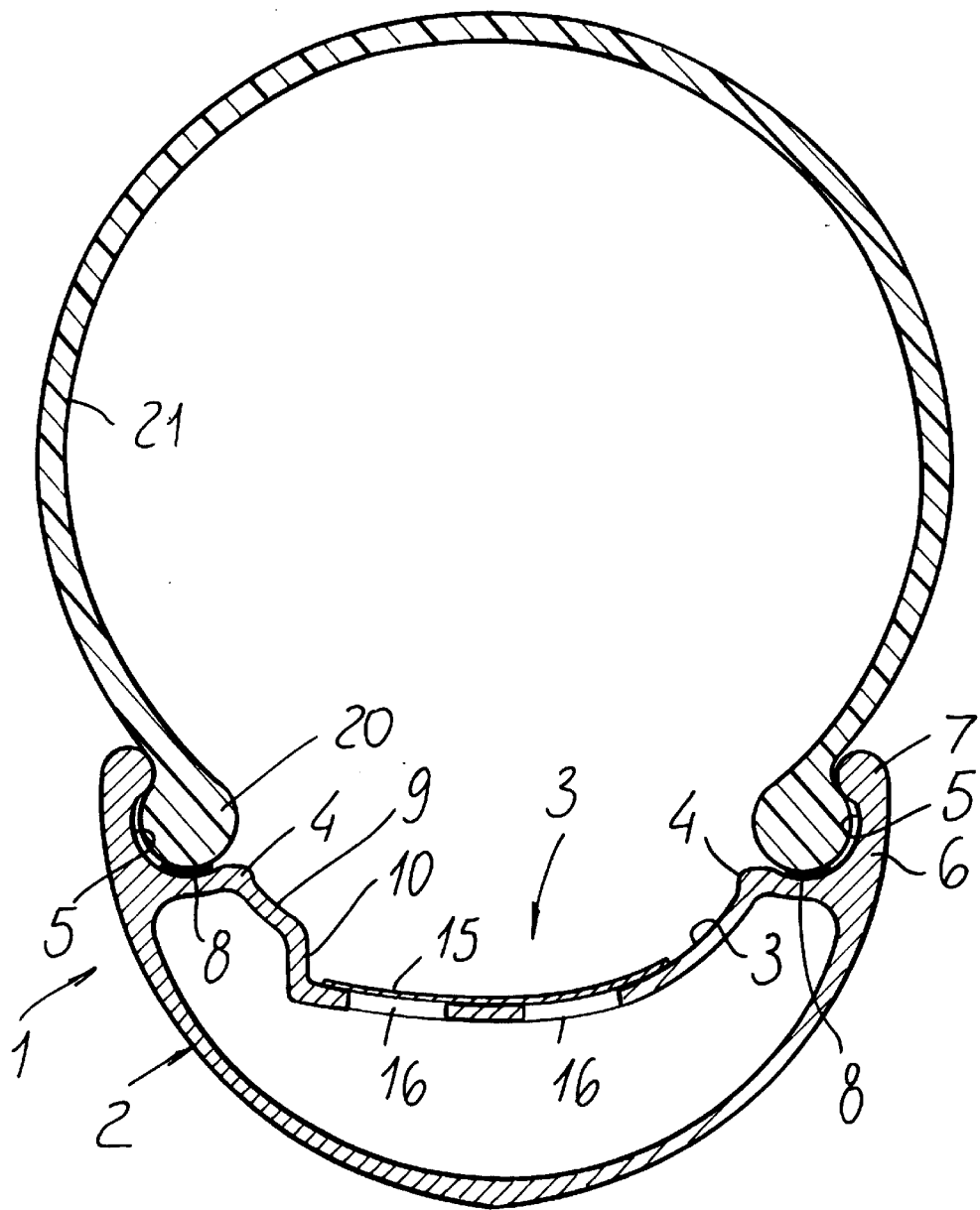
FIG. 4 is a cross-sectional view illustrating the tire coupled to the tire rim.

With reference to the number references of the above mentioned figures, the tire rim for wheels of cycles in general adapted to allow an easy and firm assembling of the tire, according to the present invention, which has been generally indicated by the reference number 1, comprises a body 2, defining a well for the tire, indicated by the reference number 3, which is delimited, at the circumferential sides thereof, by ridges 4 which extend circumferentially.

As shown, the ridges 4 adjoin tapering recesses for receiving the tire bead, said recesses being indicated by the reference number 5 and being provided on the outside thereof with a hook portion 6, or rim flange, ending with a top inwardly curved crook portion 7.

The recesses 5 are provided, on their surfaces housing the bead 20 of the tire 21, with a mechanical affixing element, indicated by the reference number 8, which is provided on the surface of the recess 5.

The well is asymmetrical and is provided, at an edge thereof, with a ramp portion 9, extending starting from a step 10.

This step laterally delimits the well 3 which, at the other edge thereof, is directed against one of the ridges 4.

With the above disclosed arrangement, the bead 20 of the tire 21 will be engaged on the tire rim by arranging it in the deepest region of the well 3, and being turned so as to cause the tire bead to engage inside thereof.

As the tire is inflated, the tire bead will be tensioned and the tire will be radially expanded, thereby forcing the tire beads outwardly, from the central line toward the ridges 4.

The latter will operate as a restraining element for holding the tire beads suitably located in the recesses 5 for the bead 20, so as to provide a sufficient force evenly distributed through the overall circumference.

As the desired force value is obtained, the bead 20 will practically jump through the ridges 4 and will engage in the region 5.

A tapering is moreover associated with the recess for the beads 20, so as to urge the beads to find a common axis on the rim, which will coincide with the axis of the wheel.

This feature will allow to automatically achieve a proper arranging of the tire on the tire rim.

The provision of an asymmetrical recess, due to the provision of the ramp 9 and of the step 10, will afford the possibility of assembling the tire also by engaging one of the tire bead in the seat 5 and causing the other tire bead to be engaged in the other seat 5 as the tire is inflated.

On the bottom of the well 3 is provided a strip element 15 designed for covering possible uneven regions of the holes 16 for engaging therein the wheel spokes and which is advantageously made of a low friction coefficient material.

Thus, the sliding movement of the bead 20 will be facilitated, so as to properly locate it in the seat therefor.

Advantageously, the mentioned strip element is made of polyethylene, polytetrafluoroethylene, UHMU-polyethylene or of a mono-filament polyethylene material.

From the above disclosure it should be apparent that the invention fully achieves the intended aim and objects.

In particular, the fact is to be pointed out that a novel rim for cycles has been provided, which allows to assemble the tire thereon in a very easy, firm and perfectly balanced manner.

In practicing the invention, the used materials, provided that they are compatible to the intended use, as well as the contingent size and shapes, can be any, depending on requirements.

I claim:

1. A tire rim for wheels of cycles in general adapted to allow an easy and firm assembling of a tire, said tire rim comprising a body the cross section of which defines:

a well for receiving therein said tire, said well having an asymmetrical construction;

a pair of ridges which laterally delimit said well;

a pair of tapering recesses each for receiving a tire bead, each tapering recess of said pair of tapering recesses being arranged adjacent to and adjoining a respective one of said pair of ridges, and each tapering recess of said pair of tapering recesses having a hook portion including a top inwardly curved crook portion;

a ramp portion and a step portion both of said well and arranged adjacent a fast one of said pair of ridges, said ramp portion having a bottom and said step portion downwardly extending from said bottom of said ramp portion; and a gradually tapered portion of said well arranged adjacent a second one of said pair of ridges, said gradually tapered portion having a convex curved surface arranged for slidably receiving a tire bead.

2. A tire rim according to claim 1, said well having a bottom surface with a plurality of spoke holes and a covering strip for covering said spoke holes, wherein said strip is made of a material having a low friction coefficient.

\* \* \* \* \*